(No Model.) 2 Sheets—Sheet 1.
G. ERTEL.
POWER MECHANISM FOR BALING PRESSES.
No. 401,424. Patented Apr. 16, 1889.
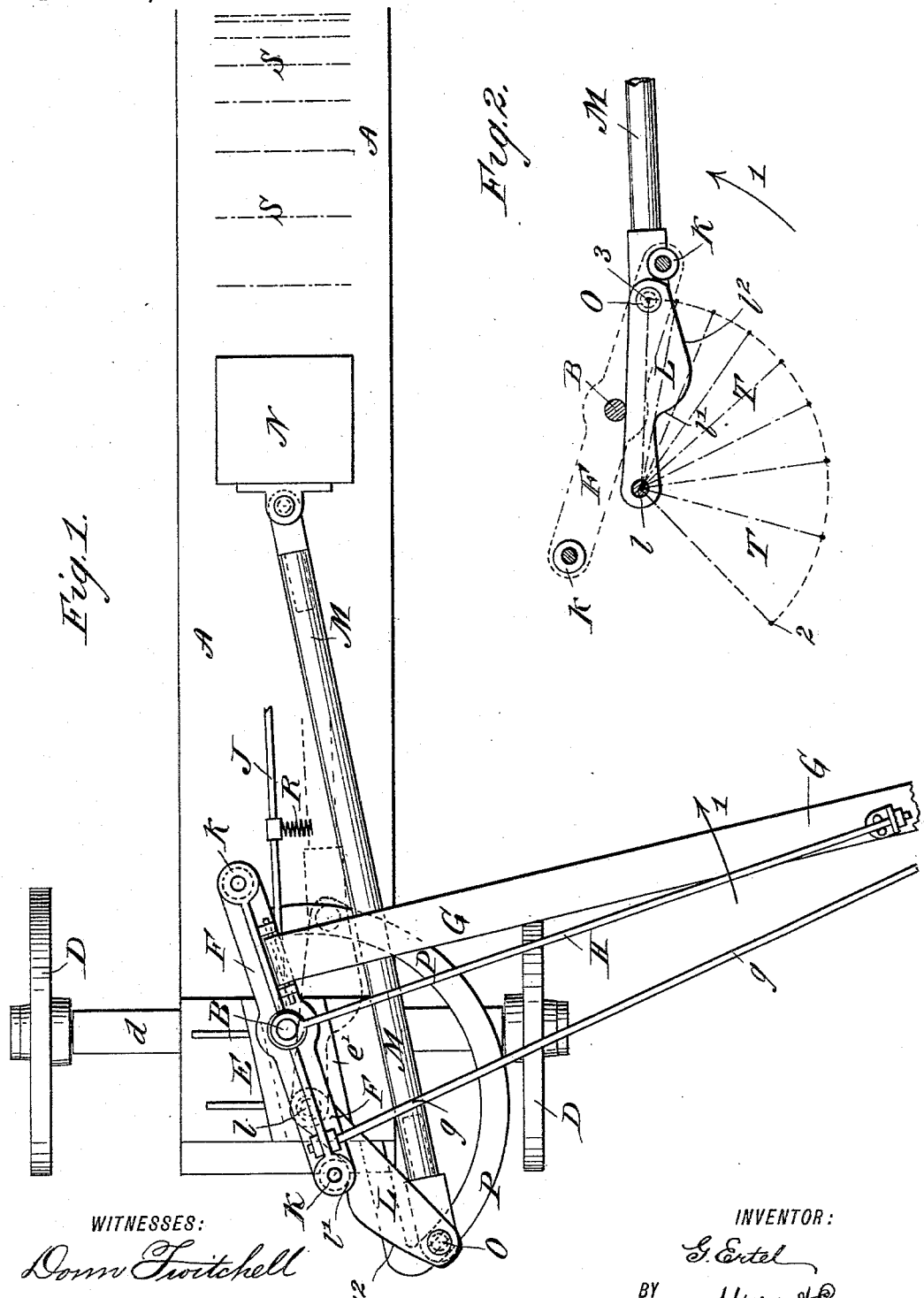
WITNESSES:
INVENTOR:
G. Ertel
BY Munn & Co.
ATTORNEYS.

(No Model.) 2 Sheets—Sheet 2.
G. ERTEL.
POWER MECHANISM FOR BALING PRESSES.
No. 401,424. Patented Apr. 16, 1889.
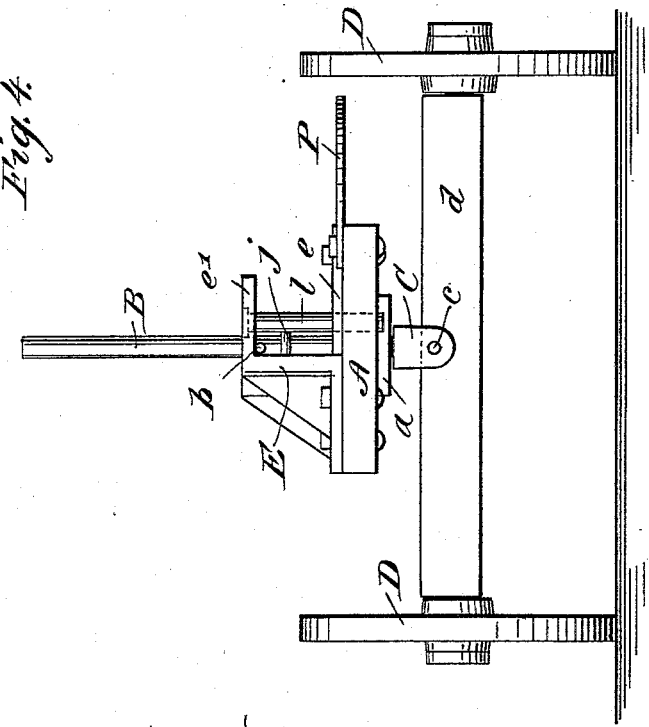
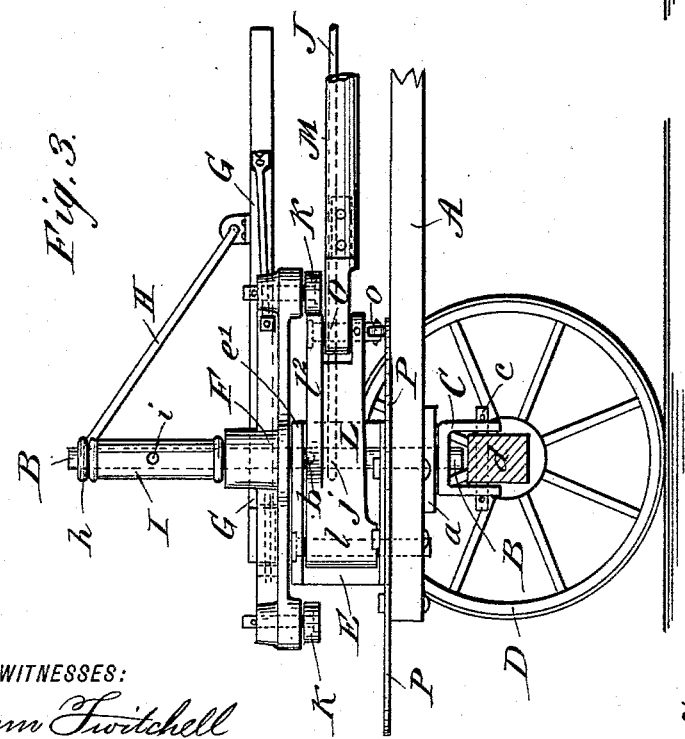
WITNESSES:
Donn Twitchell
C. Sedgwick
INVENTOR:
G. Ertel
BY Munn & Co.
ATTORNEYS.

UNITED STATES PATENT OFFICE.

GEORGE ERTEL, OF QUINCY, ILLINOIS.

POWER MECHANISM FOR BALING-PRESSES.

SPECIFICATION forming part of Letters Patent No. 401,424, dated April 16, 1889.

Application filed October 15, 1888. Serial No. 288,065. (No model.)

*To all whom it may concern:*

Be it known that I, GEORGE ERTEL, of Quincy, in the county of Adams and State of Illinois, have invented a new and Improved Power Mechanism for Baling-Presses, of which the following is a full, clear, and exact description.

My invention relates to baling-presses, and has for its special object to provide a simple, efficient, inexpensive, and durable power mechanism for giving two effective strokes of the plunger in the baling-box for each complete rotation of the sweep.

The invention consists in certain novel features of construction and combinations of parts of the press, all as hereinafter described and claimed.

Reference is to be had to the accompanying drawings, forming a part of this specification, in which similar letters of reference indicate corresponding parts in all the figures.

Figure 1 is a plan view of the power mechanism and portions of the forward end of a baling-press to which it is applied. Fig. 2 is a detail plan view illustrating the relative positions of the sweep-head and plunger-rod and pitman-knuckle at or near the completion of the effective stroke of the plunger. Fig. 3 is a side elevation of the power mechanism and the forward truck-wheels of the baling-press, the axle being in cross-section; and Fig. 4 is a front view of the press-bed and forward truck and the power-mechanism shaft and main castings thereon, the sweep, pitman-knuckle, and pitman being removed.

The drawings show only so much of the frame and trucks of a baling-press of that class known as "continuous balers" as is necessary to fully explain the power mechanism by which the plunger is operated in the baling-box to press one bale behind another as the tied bales are discharged from the contracted open rear end of the press-case.

The bed-frame A of the press carries a vertical shaft, B, which projects downward through a metal plate, $a$, on the bed and into a metal yoke, C, which straddles the axle $d$ of the front wheels, D, of the press, and a pin, $c$, passed horizontally through the yoke and axle holds the front running-gear to the press-frame, beneath which the running-gear may turn while the parts $a$ C serve as a bearing, and the shaft B acts as a king-bolt, thus allowing the press to be drawn easily by a team hitched in any approved way to the front axle.

The shaft B extends upward through the base-plate $e$ and overhanging ledge $e'$ of a heavy bracket casting or plate, E, which is securely bolted to the press-bed, and on which rests the metal head F of the sweep G, which is preferably pivoted to the head to allow its vertical adjustment at the outer end, and is sustained by a brace rod or bar, H, which has an adjustable connection at its forward end with the sweep, and at its inner end has an eye, $h$, which encircles the top of the shaft B above a sleeve, I, placed on the shaft between the brace-eye and the sweep-head, said sleeve being preferably secured to the shaft by a pin, $i$. Another metal brace-rod, $g$, connects the sweep-head with the outer part of the sweep.

Below the ledge $e'$ of the bed-bracket E a pin, $b$, is passed through the shaft B, and serves, with the sleeve I, to hold the shaft in place without the necessity of rigidly fastening it to the press-bed A, and the pin and sleeve also hold the sweep-head and sweep down to proper position on the bracket. Another brace-rod, J, having an eye, $j$, encircling the shaft B below the pin $b$, is connected in any suitable manner at its other end with the bale-chamber or body of the press.

The sweep-head carries at each end a roller, K, which rotates in a horizontal plane on or with a vertical pin held to the head, and these two anti-friction rollers or wheels are adapted to work alternately at the outer face or edge of a metal knuckle or link, L, which is pivoted at its inner end on a heavy pin or pivot, $l$, held to the press-bed bracket in front of the sweep-head shaft B, and preferably a little to one side of the lateral center of the press-case. At its outer end the knuckle L is forked and receives the outer end of the pitman M of the press-plunger N, and the knuckle is held to the pitman, preferably, by a pivot-bolt, O, which carries at its lower end a caster-wheel, $o$, which is adapted to travel on a curved metal plate or track, P, held to the press-frame and serving as a support to the pitman and knuckle, which thus have free and almost frictionless movement for a space or distance somewhat less than one-half a circle, and twice for each complete turn of the sweep around the press-case, as hereinafter more fully explained.

Figs. 1 and 2 of the drawings show that the outer edge or face of the knuckle L, which is acted on by the sweep-head rollers K K, has a somewhat sharp or quick outward curve at $l'$, just beyond where these rollers first strike the knuckle, and from this curve the face of the knuckle gradually rounds or slopes backward at $l^2$ to its outer end, which is preferably rounded and extends to a point where either of the sweep-rollers K will pass by it as the plunger reaches the extreme limit of its effective stroke.

A spring—preferably a spiral spring, R, held to the press-case—is arranged to be struck by the plunger-pitman and put in tension as the limit of the effective stroke of the plunger is reached, whereby the expansion of the spring after the sweep-head roller or bearing-point passes the arm L will force the pitman laterally and thereby assist the natural rebound of the pressed material in the baling-box in carrying the plunger back to initial position ready for its rearward effective stroke against the next charge of material fed into the baling-box.

The operation of the power mechanism is as follows: When the follower is drawn backward to its fullest extent, the parts have the respective positions shown in Fig. 1 of the drawings, the outer sweep-head roller, K, then resting at the base of the quick curve $1'$ of the knuckle L. Should the sweep G now be turned around in direction of the arrow $l$, the roller K will, by action on the curve $l'$ of the knuckle, impart a quite rapid motion to the pitman and plunger during the first part of the effective stroke of the plunger, when the compression of the material offers the least resistance, and as the motion of the sweep continues the roller K will ride over the outer curved or inclined face, $l^2$, of the knuckle, which, in connection with the gradual approach toward alignment of the roller K and the knuckle-pivot $l$ and pin O, will cause a gradually-slower inward movement of the plunger with a correspondingly-increased power until the plunger reaches the extreme limit of its effective stroke, at which time the sweep-head roller K will slip over and past the extremity of the knuckle, and the knuckle being no longer retained by the sweep-head, the expansion of the material in the baling-box, until it strikes retainers fitted therein—it may be by the spring R acting on the pitman M—instantly swings the knuckle L back to its first position, (shown in Fig. 1,) and before the other roller, K, of the sweep-head strikes the knuckle ample time is allowed the press-feeders to place the next charge of material into the press-case in front of the plunger, and as the second roller K meets the knuckle L it in turn will operate the knuckle and pitman to give the next effective rearward or pushing stroke to the plunger, substantially as above described.

It is obvious that with this power mechanism I secure two effective strokes of the plunger for every complete rotation of the sweep or travel of the horse working it around the machine, and that each stroke is made with a gradually-decreasing speed, (intended to be shown by the dotted lines at S in Fig. 1 of the drawings,) and with a correspondingly or gradually increasing power.

Fig. 2 of the drawings is somewhat in the nature of a diagram, which illustrates by radial dotted lines T, running from the knuckle-pivot $l$, between the starting and finishing points 2 and 3 of the travel of the knuckle, the gradually-decreasing relative outward or rearward throw of the plunger and knuckle, the roller K being herein shown just prior to slipping from and past the end of the knuckle.

An important advantage offered by this construction is that by shaping the outer acting face or edge of the knuckle on differently curved or inclined lines the rate of decrease of speed of travel of the plunger during its effective stroke may be regulated at will, as the nature of the material to be pressed may suggest or require.

I do not limit myself to the use of a knuckle having an abruptly convexed or curved and inclined acting face, as a straight-faced knuckle arranged with the continuously-rotated sweep would allow the sweep-head to slip past it to assure two plunger-strokes to each turn of the sweep, and with a gradually-decreasing speed of travel, due to the different pivotal points of the knuckle and sweep; but the construction shown and above described is preferred in practice.

Having thus fully described my invention, I claim as new and desire to secure by Letters Patent—

1. The combination, with the plunger-pitman and the sweep having two rollers or bearing-points on its head, of a knuckle or link pivoted at one end to the press-frame at a point between the sweep-head pivot and the range of travel of the rollers or bearing-points of the sweep-head and pivoted at its other end to the plunger-pitman, so as to give two effective rearwardly-pushing strokes of the plunger for each complete turn of the sweep, said knuckle having an outer face formed with a curve or incline where the sweep-head first strikes it to give a quick initial movement to the plunger and assure its gradually-decreasing speed as the plunger is completing its rearward effective pushing stroke, substantially as herein set forth.

2. The combination, with the plunger-pitman and the sweep having a bearing point or roller on its head and a knuckle or link pivoted at one end to the press-frame at a point between the sweep-head pivot and the range of travel of the sweep-head bearing point or roller and pivoted at its other end to the pitman, of a spring arranged to be struck and put in tension by the pitman to assure rebound of the plunger after the sweep-head bearing point or roller slips past the end of the knuckle, substantially as herein set forth.

3. The combination, with the bed or frame A and the front truck, $d$ D D, of the press, of a yoke, C, connected to the axle, a plate, $a$, on the frame and resting on the yoke, a vertical shaft, B, on the frame and passing through the parts $a$ C as a king-bolt, a sweep-head, F, on said shaft, a sleeve, I, and pin $b$ on the shaft, and a knuckle, L, pivoted at $l$ to the press-frame and adapted for engagement by the sweep-head, substantially as shown and described.

4. The combination, with the press-frame, of a bracket, E, having base $e$ and ledge $e'$, a shaft, B, and pin $b$, a knuckle, L, pivoted on a pin, $l$, between the parts $e$ $e'$ and connected at its outer end to the plunger-pitman, a sweep having a head, F, fulcrumed on the shaft B and having rollers K K, a sleeve, I, on said shaft, a track, P, on the press-frame, and a roller, $o$, next the joint of the knuckle and pitman, substantially as herein set forth.

GEORGE ERTEL.

Witnesses:
CHAS. M. ERTEL,
RICHD. JANSEN.